United States Patent Office 2,921,585
Patented Jan. 19, 1960

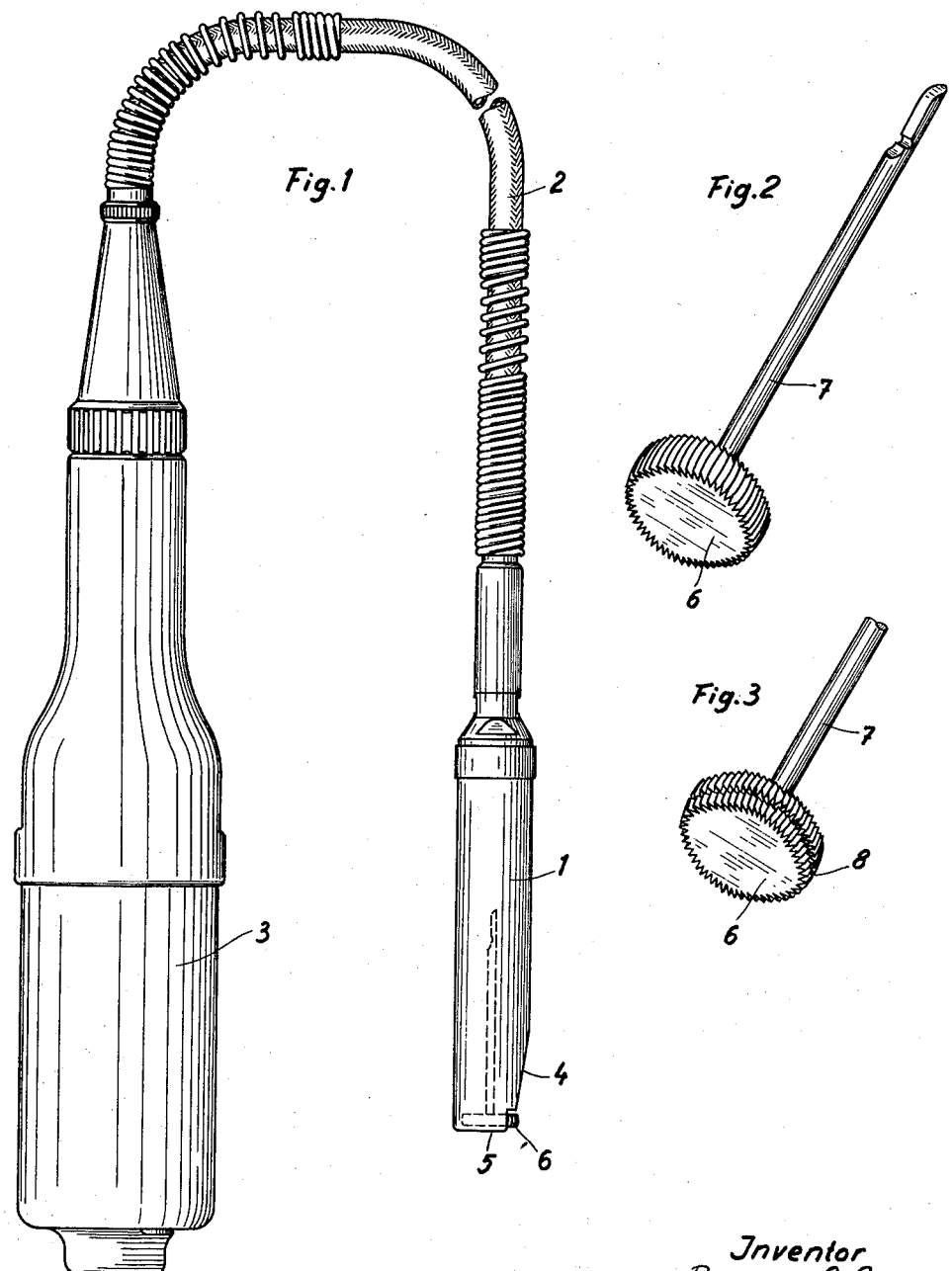

2,921,585

DEVICE FOR THE TREATMENT OF SKIN DISEASES SUCH AS SKIN OVERGROWTHS, ERUPTIONS AND THE LIKE OR OTHER SKIN DISFIGUREMENTS

Reinhold S. Schumann, Racine, Wis.

Application October 26, 1955, Serial No. 542,996

Claims priority, application Germany July 1, 1955

2 Claims. (Cl. 128—355)

The invention relates to a device for the treatment of skip diseases such as skin overgrowths, eruptions and the like or other skin disfigurements such as tattooing, dirt inclusions etc. and aims at providing a device which permits of a removal of diseased or disfigured skin by mechanical means with a tool having a satisfactory performance for a long period of time.

It is already known to subject diseased parts of skin such as skin overgrowth, eruptions and the like, or other skin disfigurements such as tattooing, dirt inclusions etc. to a removing treatment in that the skin area is scraped with a scraper rotating at great speed.

The scraping disc in the form of grinding stones used for this purpose takes up the removed skin parts and also blood onto its scraping surface so that the scraping surface loses its scraping capacity and very soon no removing action is obtained by means of the grinding stone.

To obviate this drawback, the invention proposes as a removing tool a side-milling or similar cutter in which the gaps between the milling teeth cannot be so easily blocked up. Contrary to grinding discs which actually only operated by a surface friction, the side-milling cutter takes off the skin parts more by cutting whereby there are sufficiently large gaps between the milling cutters to take away the removed skin parts. This leads to far better results with a tool removing the skin by milling than with grinding discs.

The side milling cutter may be provided in its peripheral direction with nicks in the teeth forming grooves whereby the carrying away of the removed skin parts is further improved.

The drawing illustrates two embodiments of the invention.

Fig. 1 shows an outside view of a device with driving motor.

Fig. 2 illustrates a milling tool,

Fig. 3 shows another embodiment of the milling tool.

The device consists of a hand piece 1 the casing of which is connected to the covering of the flexible shaft 2. The flexible shaft 2 is connected to the motor 3 and is driven by same. The casing of the hand piece has at its free end a bevelled portion 4 which lies on the side of the working area of the device and is open at its end 5. The side-milling cutter 6 with its spindle extension 7 is inserted in the hand piece. The spindle extension is fastened onto the flexible shaft which however is not specially illustrated as such a fastening is generally known. A chuck may be placed in the hand piece for the connection of the spindle 7 to the flexible shaft.

The side-milling cutter may be more or less wide. It runs at 25,000 and more revolutions per minute.

Other forms of the miller are possible besides those embodiments illustrated.

In Fig. 2 the whole periphery of the miller is toothed while in the embodiment according to Fig. 3 the disc miller has a middle peripheral groove 8. Several peripheral grooves may also be provided. The peripheral grooves form nicks in the cutting teeth of the miller.

I claim:

1. A device for removing material at a skin surface including diseased skin parts such as skin overgrowths, eruptions and the like, and other skin disfigurements such as tattooing and dirt inclusions, said device comprising a spindle for connection to a flexible drive shaft, a milling cutter connected to the end of said spindle, cutting teeth formed at the periphery of said milling cutter for removing the material at a skin surface, said cutting teeth including nicks formed in adjacent cutting teeth, said nicks forming a groove in the cutting surface of said milling cutter, a substantially cylindrical casing substantially surrounding said spindle and said milling cutter and forming a handpiece, a notched aperture in said casing through which a small portion of said periphery of said milling cutter extends for contacting material at a skin surface, said casing including a bevelled portion extending from a position distant from said spindle and said milling cutter diagonally inwardly toward said spindle and said milling cutter and terminating at the outer edge of said notched aperture.

2. A device for removing material at a skin surface including diseased skin parts such as skin overgrowths, eruptions and the like, and other skin disfigurements such as tattooing and dirt inclusions, said device comprising a spindle for connection to a flexible drive shaft, a milling cutter connected to the end of said spindle, cutting teeth formed at the periphery of said milling cutter for removing the material at a skin surface, a substantially cylindrical casing substantially surrounding said spindle and said milling cutter and forming a handpiece, a notched aperture in said casing through which a small portion of said periphery of said milling cutter extends for contacting material at a skin surface, said casing including a bevelled portion extending from a position distant from said spindle and said milling cutter diagonally inwardly toward said spindle and said milling cutter and terminating at the outer edge of said notched aperture.

References Cited in the file of this patent

UNITED STATES PATENTS

| | | |
|---|---|---|
| 1,915,305 | Gallagher | June 27, 1933 |
| 2,389,665 | Harris | Nov. 27, 1945 |
| 2,429,356 | Hicks | Oct. 21, 1947 |
| 2,712,823 | Kurtin | July 12, 1955 |

FOREIGN PATENTS

| | | |
|---|---|---|
| 340,377 | Great Britain | Jan. 1, 1931 |

OTHER REFERENCES

The Jota Works Catalogue B32, Funko Bros., Ltd., p. 3. (Copy in Division 55.)

Eller: New England Journal of Medicine; July 7, 1955, vol. 253, pages 11–14. Photocopy in Div. 55. (Original article may be found in the National Library of Medicine, Washington, D.C.)